(12) United States Patent
Haiut (10) Patent No.: US 11,087,205 B2
(45) Date of Patent: Aug. 10, 2021

(54) NEURAL CELL AND A NEURAL NETWORK (71) Applicant: DSP Group Ltd.

(72) Inventor: Moshe Haiut, Ramat Gan (IL)

(73) Assignee: DSP GROUP LTD., Herzliya (IL)

( * ) Notice: Subject to any disclaimer, the term of this patent is extended or adjusted under 35 U.S.C. 154(b) by 872 days.

(21) Appl. No.: 15/877,459

(22) Filed: Jan. 23, 2018

(65) Prior Publication Data

US 2018/0225564 A1 Aug. 9, 2018

Related U.S. Application Data

(60) Provisional application No. 62/449,129, filed on Jan. 23, 2017.

(51) Int. Cl.
| | | |
|---|---|---|
| *G06N 3/04* | (2006.01) | |
| *G06N 3/08* | (2006.01) | |
| *G06F 17/11* | (2006.01) | |
| *G06F 7/58* | (2006.01) | |
| *G06N 3/063* | (2006.01) | |
| *G06F 30/20* | (2020.01) | |
| *G06F 111/10* | (2020.01) | |
| *G06F 119/12* | (2020.01) | |

(52) U.S. Cl.
CPC ............ *G06N 3/049* (2013.01); *G06F 7/58* (2013.01); *G06F 17/11* (2013.01); *G06F 30/20* (2020.01); *G06N 3/0445* (2013.01); *G06N 3/0481* (2013.01); *G06N 3/063* (2013.01); *G06N 3/08* (2013.01); *G06F 2111/10* (2020.01); *G06F 2119/12* (2020.01); *G06F 2207/4824* (2013.01)

(58) Field of Classification Search
CPC ...................................................... G06N 3/04
USPC .......................................................... 706/15
See application file for complete search history.

(56) References Cited

U.S. PATENT DOCUMENTS

| | | | | |
|---|---|---|---|---|
| 8,930,291 B1 * | 1/2015 | Srinivasa | ............... | G06N 3/049 706/15 |
| 2005/0102247 A1 * | 5/2005 | Wells | .................... | G06N 3/063 706/26 |

* cited by examiner

*Primary Examiner* — David R Vincent
(74) *Attorney, Agent, or Firm* — Reches Patent (57) ABSTRACT

A neural network that may include multiple layers of neural cells; wherein a certain neural cell of a certain layer of neural cells may include a first plurality of one-bit inputs; an adder and leaky integrator unit; and an activation function circuit that has a one-bit output; wherein the first plurality of one-bit inputs are coupled to a first plurality of one-bit outputs of neural cells of a layer that precedes the certain layer; wherein the adder and leaky integration unit is configured to calculate a leaky integral of a weighted sum of a number of one-bit pulses that were received, during a time window, by the first plurality of one-bit inputs; and wherein the activation function circuit is configured to apply an activation function on the leaky integral to provide a one-bit output of the certain neural cell.

20 Claims, 9 Drawing Sheets

Calculating, by an adder and leaky integration unit of the certain neural cell, a leaky integral of a weighted sum of a number of one-bit pulses that were received, during a time window, by a first plurality of one-bit inputs of the certain neural cell; wherein the certain neural network belongs to a certain layer of neural cells of the neural network; wherein the first plurality of one-bit inputs are coupled to a first plurality of one-bit outputs of neural cells of a layer that precedes the certain layer. 210

Applying, by an activation function circuit of the certain neural cell, an activation function on the leaky integral to provide a one-bit output of the certain neural cell. 220

NEURAL CELL AND A NEURAL NETWORK

CROSS REFERENCE

This application claims the priority of U.S. provisional patent 62/449,129 filing date Jan. 23, 2017.

BACKGROUND

Some IOT devices require low-power implementation of simulated neural networks that were already trained in lab to perform given functionalities.

The straight forward implementation is via software that runs on a given platform (e.g. a multi-core GPU) which requires high power. More efficient hardware implementations take advantage of the parallel nature of a neural network and use hardware architectures that are derived from the network topography.

IBM uses such an architecture in the SyNAPSE TrueNorth chip, where independent neurosynaptic cores contain multiple neurons, dentrites, synapses, and axons.

SUMMARY

There may be provided a neural network, may include multiple layers of neural cells; w wherein a certain neural cell of a certain layer of neural cells may include a first plurality of one-bit inputs; an adder and leaky integrator unit; and an activation function circuit that has a one-bit output; wherein the first plurality of one-bit inputs may be coupled to a first plurality of one-bit outputs of neural cells of a layer that precedes the certain layer; wherein the adder and leaky integration unit may be configured to calculate a leaky integral of a weighted sum of a number of one-bit pulses that were received, during a time window, by the first plurality of one-bit inputs; and wherein the activation function circuit may be configured to apply an activation function on the leaky integral to provide a one-bit output of the certain neural cell.

The activation function may be a sigmoid and wherein the activation function unit may include a random number generator for generating random numbers and a comparator for comparing the leaky integral to a sum of at least two of the random numbers.

The activation function may be a sigmoid and wherein the activation function unit may include a pseudo-random number generator for generating pseudo-random numbers and a comparator for comparing the leaky integral to a sum of at least two of the pseudo-random numbers.

The activation function may be a rectified linear unit, and the activation function circuits may be configured to calculate the rectified linear unit.

The certain neural cell may include multiple flip-flops that may be configured to store the one-bit pulses, a memory for storing a bias value and for storing weights associated with the one-bit inputs, and an adder that may be configured to calculate the leaky integral using the content of the multiple flip-flops, the bias value and the weights.

The adder and leaky integrator unit may include a shift register that may be configured to apply a leaky function.

The neural network may be free of multipliers.

The neural network consists of up to 200 neurons.

The neural cells of an input layer of the neural network have a single one-bit input.

The neural network may be a purely digital neural network.

There may be provided a method for performing neural network processing, the method may include performing multiple neural network processing iterations; wherein each neural network processing iteration may include determining, by a neural cell that may be coupled to multiple previous neural cells, which previous neural cell generated a pulse between a previous processing iteration and a current processing iteration; for each previous neural cell that generated such a pulse adding a synopsis weight assigned to that previous neural cell to generate a weighted sum; calculating a sum of a bias and (a) a product between a memory constant (alpha) and a sum of (b) the weighted sum and state variable of previous processing iteration; comparing the sum to a random or pseudo-random variable; and selectively generating an output pulse based on the comparison result.

There may be provided a method for activating a certain neural cell of a neural network, wherein the method may include calculating, by an adder and leaky integration unit of the certain neural cell, a leaky integral of a weighted sum of a number of one-bit pulses that were received, during a time window, by a first plurality of one-bit inputs of the certain neural cell; wherein the certain neural network belongs to a certain layer of neural cells of the neural network; wherein the first plurality of one-bit inputs may be coupled to a first plurality of one-bit outputs of neural cells of a layer that precedes the certain layer; and applying, by an activation function circuit of the certain neural cell, an activation function on the leaky integral to provide a one-bit output of the certain neural cell.

The activation function is a sigmoid and wherein the applying of the activation function may include generating random numbers by a random number generator of the activation function circuit and comparing, by a comparator of the activation function circuit, the leaky integral to a sum of at least two of the random numbers.

The activation function is a sigmoid and wherein the applying of the activation function may include may include generating, by a pseudo-random number generator of the activation function circuit, pseudo-random numbers and comparing, by a comparator of the activation function circuit, the leaky integral to a sum of at least two of the pseudo-random numbers.

The activation function is a rectified linear unit, and wherein the applying of the activation function may include may include calculating the rectified linear unit.

The method may include storing by multiple flip-flops of the certain neural cell the one-bit pulses, storing by a memory of the certain neural cell a bias value and weights associated with the one-bit inputs, and calculating by an adder of the certain neural cell, the leaky integral using the content of the multiple flip-flops, the bias value and the weights.

The method may include applying, by a shift register of the adder and leaky integrator unit, a leaky function.

There may be provided a method for detecting a sound event having a sound event signature, the method may include receiving or learning the sound event signature by a compact neural network that consists up to 150 neural cells; receiving from one or more digital microphones one or more streams of one-bit pulses; processing, by the compact neural network, the one or more streams of one-bit pulses to provide one or more received signals signatures; and detecting the sound event based on a comparison between the sound event signature and the one or more received signals signatures.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

There may be provided a neuron cell, a neural network, a system that includes a neuron cell and/or a system that includes a neural network.

The system may include many neuron cells—that may be arranged in various manners. Any arrangement can be provided. An example of an arrangement may include a hierarchical arrangement of neuron cells in which multiple neurons cells of a certain layer feed a neuron cell of a higher layer.

The neuron cell is a digital neuron cell of an integrate-and-fire type and may be optimized to be used as a building block for an ultra-low-power silicon design of a neural network of a given structure and given synapses values. The proposed neuron mathematical model is something between a simple static neuron and a LSTM (Long Short Term Memory) cell.

The terms spike and pulse are used in an interchangeable manner.

The neuron cell has the following features:

a. The neuron cell is a synchronous digital design that may be operated on a single clock as a time-base.

b. The neuron cell output spike may be synchronized with the system clock and may last a single cycle.

c. The neuron cell "output level" may be defined linearly by its spike rate which ranges between 0 and a global maximum spike-rate (which is an integer division of the system clock frequency), which represents the level 1. During each second the neuron cell performs multiple processing iterations and the outcome of each processing iteration may be a single output pulse. The spike rate is the number of output pulses per second.

d. The inter-connection between two neuron cells within the network may be via a single wire.

e. Synapses weights are multi-bit words and are kept in a neuron dedicated memory (such as a ROM or non-volatile memory)

f. Each neuron cell may incorporate a leaking integrator with a time-constant that is controlled by a parameter alpha ($\alpha$) that may be predefined and/or may be changed.

g. A pseudo-random generator logic that exists inside each neuron facilitates the implementation of smooth activation function and spreading the spike timings in a minimum cost of silicon area.

h. The neuron activation function defines the average spike rate at the neuron output versus the sum of its internal integral value and the bias theta. One or more different known activation functions (for example between one to three) can be selected, based on the nature of a random variable probability distribution function. Since the activation functions that are implemented are known in the literature, existing Deep-Learning tools can be used for designing the whole network. There is no need to make any modifications to these Deep-Learning tools in order to fit them to the nature of the proposed h/w neuron.

i. A neuron network that includes the neuron cell occupies relatively small silicon area, runs on a slow clock, and consumes ultra-low power.

Figure 1:
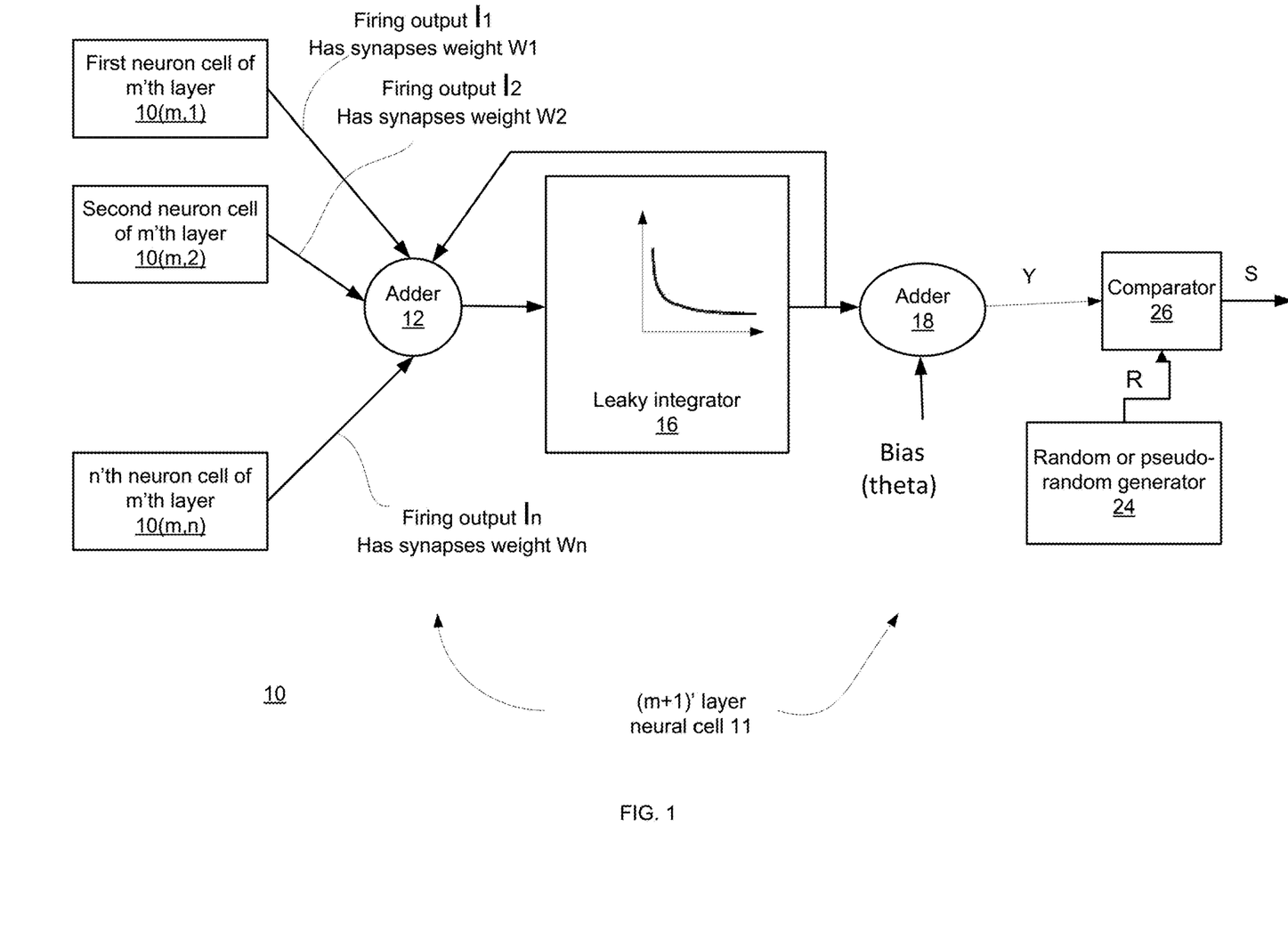
FIG. 1 illustrates a mathematical model of a neuron cell.

FIG. 1 illustrates the mathematical model of the neuron cell.

The neuron cell 11 is preceded by n neuron cells of a m'th layer 10(m,1)-10(m,n). These n neuron cells may or may not fire pulses (a single pulse or zero pulses per each processing operation, and each one of the n neuron cells of the m'th layer has a synapsis weight—thus neural cells 10(m,1)-10(m,n) have n synapses weights W1-Wn.

During each processing iteration adder 12 perform a weighted sum of $I_j*W_j$, for j between 1 and n. $I_j$ is set when the j'th neural cell of the m'th layer fires a pulse between the k−1'th and the k'th processing iterations.

The weighted sum is provided to a leaky integrator 16 that has a "memory" constant alpha to provide an output that is added (adder 18) to bias theta and compared by Comparator 26 to a random value R that is generated by a Random Generator 24 at the end of each processing iteration. An output pulse S is generated if and only if the output of adder 18 exceeds the current random value R.

The statistical characteristics of the generated random variable define the neuron activation function. In this neuron the activation function defines the average spike rate at the neuron output versus the value at the output of adder 18

For a current processing iteration (the k'th processing iteration) the neural cell may apply the following equation:

$$Y_k = \text{alpha} * (Y_{k-1} + \Sigma_{j=1}^{n} Ij * Wj) + \text{theta}$$

This mathematical model fits the common used neuron model in most of the existing NN Deep-Learning software tools. This means that the network design for a specific problem can be done via existing neural-network design tools, and after the optimal set of weights Wi is defined, one can implement the network using the proposed neuron cell.

The proposed neuron cell differs from the depicted mathematical model in that it uses digital components (rather than analog) and is processed in discrete points on the time axis. Anyway, it can behave similar to a continuous time element in the sense of Nyquist theorem where the network global maximum spike-rate is regarded as the upper limit for the sampling rate of the input/output vectors.

The signal levels at the inputs and outputs of each neuron within the network in the equivalent mathematical model can be defined in the proposed digital implementation by the average temporary spike rates.

Figure 2:
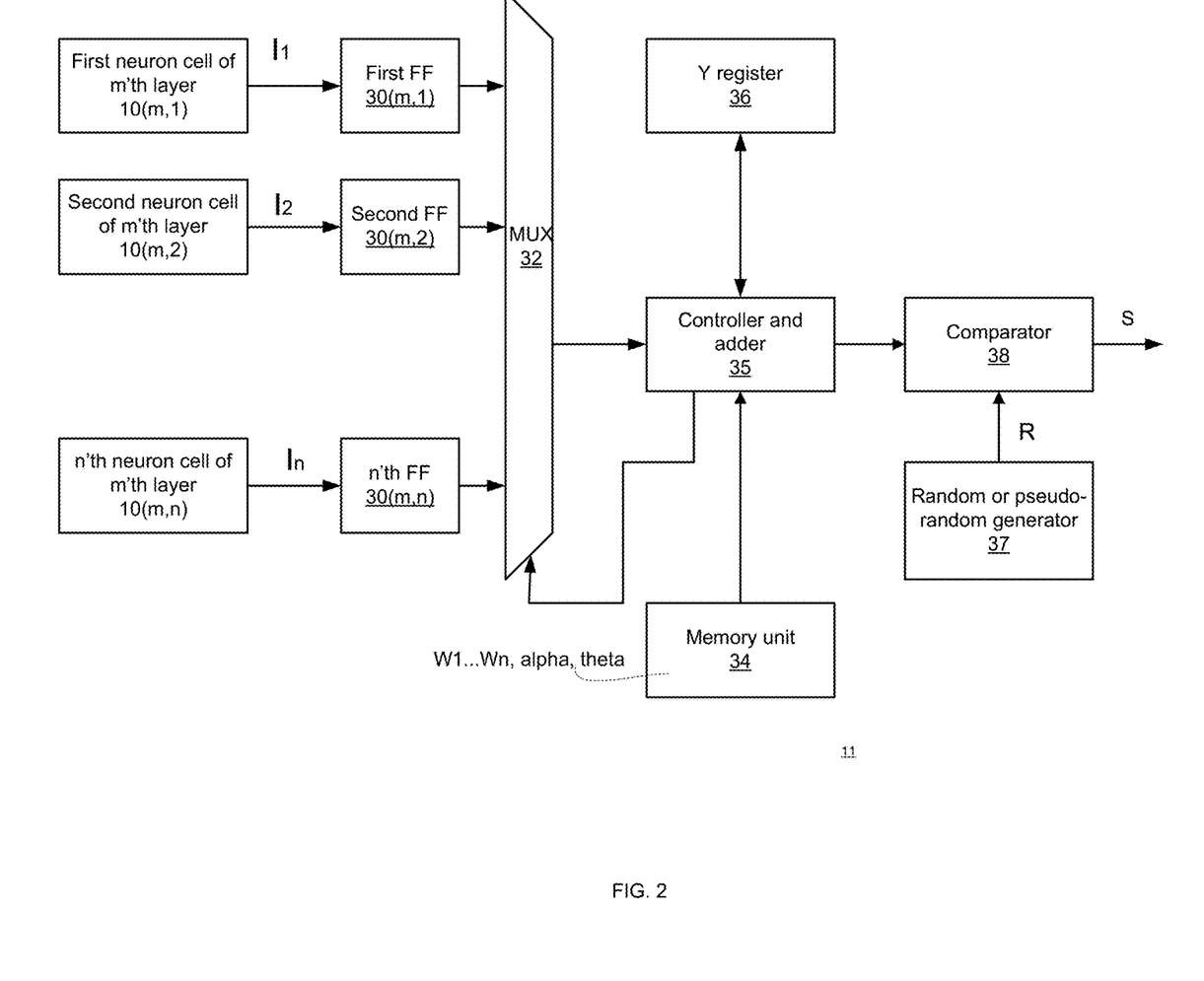
FIG. 2 illustrates a neuron cell.

FIG. 2 illustrates an example of a digital architecture of a neuron cell 11.

It is assumed that the neuron cell 11 operates on signed integers. It should be noted that any other number formats may be used.

The neuron cell belongs to the (m+1)'th layer of neuron cells and is preceded by m'th layer neuron cells. There may be multiple nuron cells and multiple layers. The number of layers may exceed 5, 10, 20 and even more.

The neuron cell 11 is preceded by n neuron cells of the previous layer (in FIG. 2—the m'th layer) 10(m,1)-10(m,n). These n neuron cells are followed by n flipflops First FF till n'th FF 30(m,1)-30(m,n) that may store a spike event—if such occurred between a previous processing iteration and the current processing iteration. The current iteration may be referred to as the k'th processing iteration and the previous processing iteration is referred to as the (k−1)'th processing iteration.

Each flip-flop may store a bit that indicates whether a spike occurred.

The neuron cell 11 includes an input multiplexer 32 that is controlled by controller and adder 35.

During each processing iteration, the controller and adder 35 scans the inputs of the multiplexer to find which m'th layer neuron cell fired a pulse between the (k−1)'th and the k'th processing iterations.

When finding such a neuron cell the synapsis weight associated with that neuron cell (weight stored in memory unit 34) is added to a state variable that is stored in Y register 36.

The flip-flops may be cleared after being read by the controller and adder 35. The controller and adder may be implemented by a controller and a separate adder. The controller and adder 35 may implement a state machine.

The adder and/or the Y memory shifting capabilities may be implemented by any logic capable of executing number manipulation—such as an arithmetic logic unit—especially a multiplier-free ALU.

The Y register 36 may store a state variable (for example a signed integer value) and expresses the hidden value of the neuron (which is also the leaking integrator value).

At the end of the k'th processing iteration the Y register 36 may store the following value:

$$Y_k = \text{alpha} * \left( Y_{k-1} + \sum_{j=1}^{n} Ij * Wj \right) + \text{theta}$$

The multiplication between alpha (that may range between zero and one) and the value in the parentheses ($Y_{k-1} + \Sigma_{j=1}^{n} Ij * Wj$) may be performed in various manners.

For example—in a multiplier-free implementation of the neuron cell the multiplication of the value in the parentheses by alpha may be performed by (i) storing the value in the parentheses, (ii) shifting the value in the parentheses to the right, and (iii) subtracting the shifted value of the value in the parentheses from the stored value. For example, if alpha equals 63/64 then the shift to the right should include shifting by 6 bits.

The memory unit 34 may be a ROM or any other type of memory unit and may store all the synapses weights for the neuron cells inputs, as well as bias (theta) which is the neuron offset value, and alpha—which is the neuron leakage constant.

The random or pseudo random generator 37 is capable to produce a random or pseudo random variable R (signed random integer) per each processing iteration. Its probability distribution function can be uniform or Gaussian (consists of a sum of uniform distributed random variables).

Controller and adder 35 adds bias theta to Y to provide the final value of Yk. The final value of Yk is compared to R by comparator 38—and if the final value of Yk is greater or equal to R then a spike is produced at the neuron output.

During the k'th processing iteration the comparator 38 compares Yk to Rk and produces an output spike Sk request if Yk>Rk. Else—no request for output pulse is generated. The output spike request is registered in the state-machine and a spike is produced in a pseudo-random timing during the k+1'th processing iteration. This is done by making re-use of the combination of the counter that is used for input addressing and the pseudo-random generator. This random spike timing mechanism minimizes the occurrence of spikes over the chip power-supply wirings due to too many firings simultaneously.

Theta is the neuron bias value, and it can be determined after deep learning/simulation/training.

The number of processing iteration per second can be determined in various manners.

Each input of the neuron cell is a single wire, and it carries spikes of a single clock cycle each.

It is assumed that for any given input there is a gap of at least Q clock cycles between any two subsequent spikes.

The output of the neuron cell is a single wire, and it carries spikes of a single clock cycle each.

In the output of the neuron cell there is a gap of at least Q clock cycles between any two subsequent spikes.

At each processing iteration zero output pulses or a single output pulse are generated.

The proposed neuron is relatively a simple architecture (e.g. it does not contain multipliers) and low-power, as the frequency of the system clock Fclk, can be kept low because it is only proportional to the maximum number of neuron inputs within the network and not to the number of neurons. This is because the maximum rate of the pulses is kept constant throughout the network (regarded as "sampling rate"). The clock frequency Fclk is at least xN times this "sampling frequency" in order that the synchronous design of the neuron can take care of all the N inputs that may arrive during a single cycle of a pulse slot (which is a cycle of the "sampling frequency").

It is known that in the deep-learning training process the synapses weights of the neurons are modified and tuned to reach their optimal values, and so is the offset value theta.

As part of the network training, the parameter alpha of each neuron can also be modified to reach its optimal value.

As a result, an individual neuron of the proposed architecture can adopt the functionality of a pure integrator. This means that implementations of Continuous Time Recurrent Neural Networks (CTRNN) can be based on initial structures that only contain layers of pure neurons, without the need to involve integrators in the feedback loops.

Thus—by determining the value of alpha we introduce a behavior that is time dependent and tunable. Thus—by changing alpha we may obtain different behaviors of the neural cell over time.

The following example was simulated in a C-program. In this example:

a. The number of neuron inputs is an integer parameter
b. Y register is a 20-bit signed integer
c. Wi are 9-bit signed integers (ranging from −256 to +255)
d. Θ is a 9-bit signed integer (ranging from −256 to +255)
e. α is 63/64 (i.e. Y register is shifted right by 6 bits and subtracted from its original value to produce the leaking effect at the end of each processing iteration)

Figure 3:
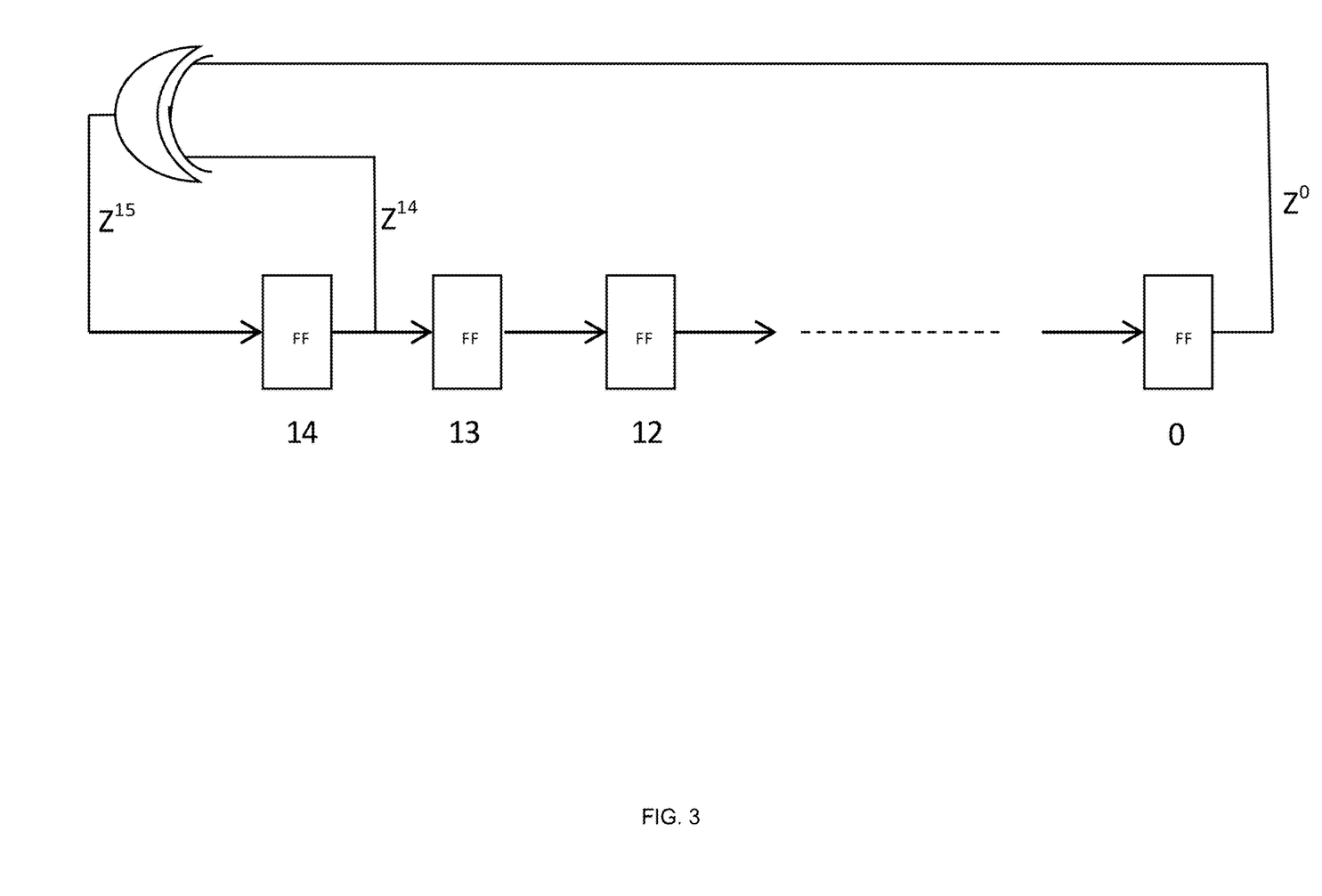
FIG. 3 illustrates a circuit.

The random variable is produced in two steps as illustrated below:

a. Step 1: Linearly-distributed random signed-integer of 13-bits (including the sign): Using a 15-bit PN series based on the polynomial $Z^{}15+Z^{}14+1$ (see FIG. 3). The machine is based on a 15 flip-flops shift-register. The random number is generated by running the machine for 13 clock cycles (13 times shift right) and take the 13-bit 2's-compliment integer from flip-flops number 12-0 where bit 12 is used as the sign bit. The basic module of the random number generator produces a pseudo-random bit stream that repeats every $2^{**}15-1$ bits (as there are 15 flip-flops). In order to produce a sequence of independent 13-bit random values, it requires 13 clock cycles per each value (it produces one output bit in every clock cycle, and the bits can be taken from the 13 LS-flip-flops every 13 clock cycles on their way to the output
b. Step 2: Near Gaussian-distributed random signed-integer of 16-bits (including the sign): Repeat the operation described in step 1 for 8 times, producing 8 signed-integers of 13-bit each. Use the adder to sum-up all the 8 numbers to produce a 16-bit 2's-compliment integer.

The comparator can be operated in 3 modes of operation, depending on the neuron activation function that is selected for the neural network:

a. "Binary Step" activation function: The final value of Y register is compared to 0, and if bigger a spike is produced at the output.
b. "Identity" activation function: Bits 20-4 of Y are compared to the linearly-distributed random signed-integer of 13-bits, and if bigger or equal a spike is produced at the output.
c. Sigmoid" activation function: Bits 20-1 of Y are compared to the Gaussian-distributed random signed-integer of 16-bits, and if bigger or equal a spike is produced at the output.

Simulation assumes 1 MHz clock for the digital circuit

Neuron process iteration rate is set to 600 Hz. This means that the maximum spike rate is 600 Hz, that is to say that each neuron in the network produces between 0-600 spikes in every one second.

Figure 4:
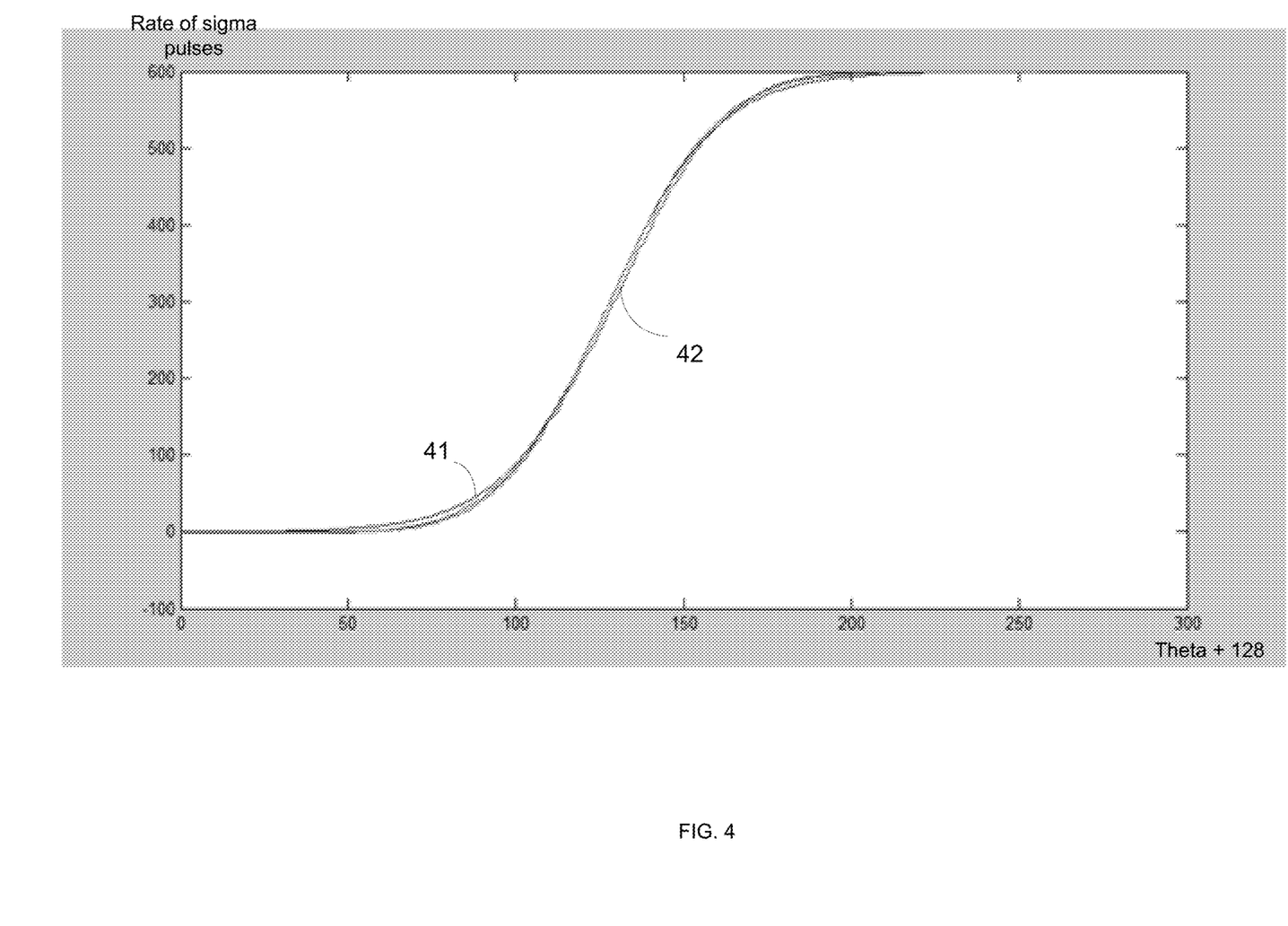
FIG. 4 illustrates a relationship between the rate of sigma pulses and the neuron cell bias.
Figure 5:
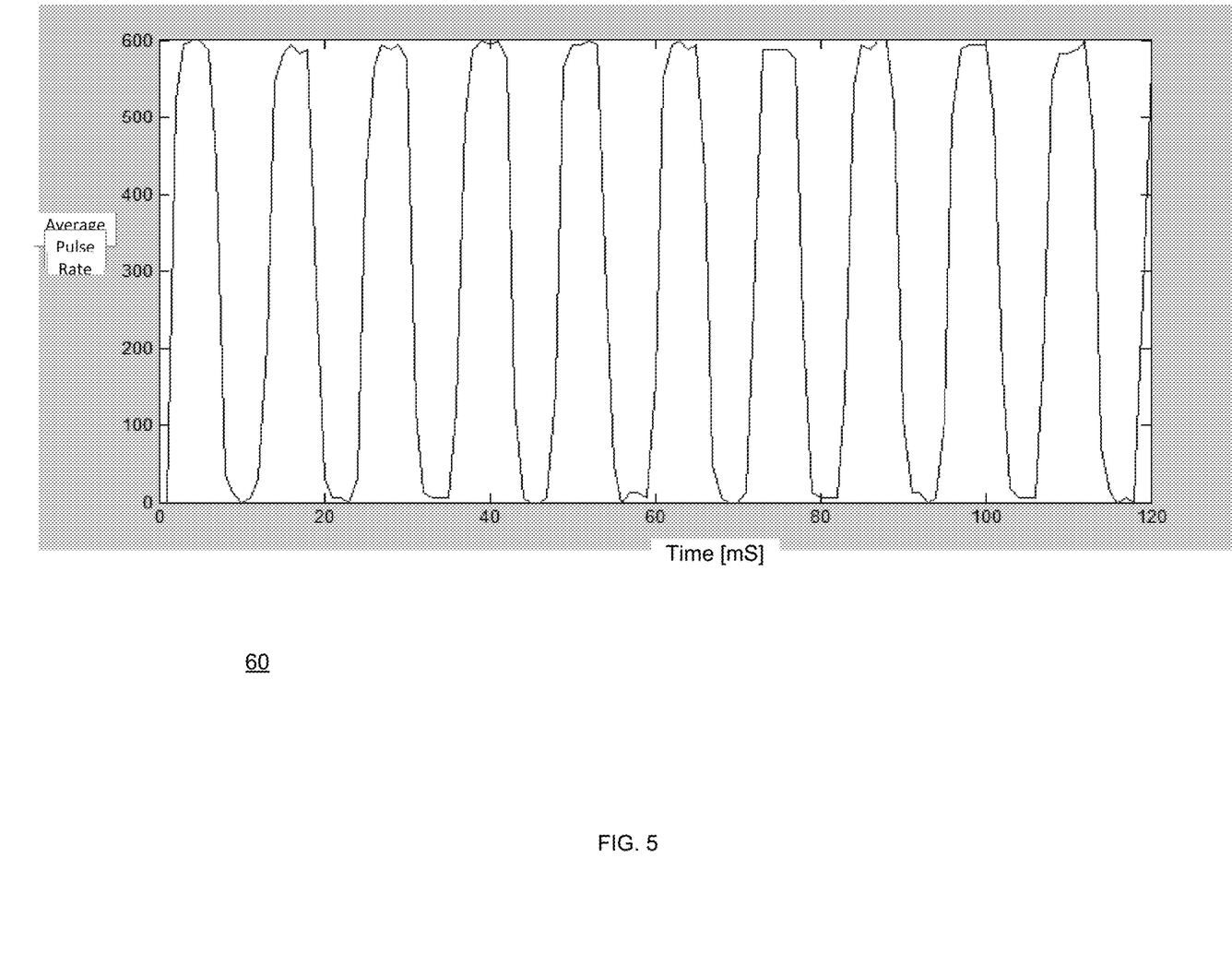
FIG. 5 illustrates an oscillatory signal.

The simulation was used to build small networks and examine special features and characteristics of the proposed neuron:

a. Setting activation function to the "Sigmoid" mode, the average spike rate at the neuron output was measured over a period of 10 seconds for different values of the bias Θ while all inputs are 0 (i.e. no input spikes). The result 42 (in RED color) is shown in FIG. 4 and it only slightly differs from the theoretical Sigmoid function 41 $S=1/(1+e^{**}(-x))$ (in BLUE color). The actual function is the mathematical "Error Function" which is defined as the integral of the Gaussian function between −∞ and x.
b. For the default leaking parameter α=63/64 (applied at 600 Hz rate) the neuron exhibits a delay in the order of 100 ms (the specific delay depends on input intensity and weight). This is measured for a single input neuron with W=128 where the input contains a burst of full-rate spikes every few seconds. This delay feature enables the network to produce complicated time-varying outputs as well as to react to time-varying vectors in its input.
c. Because the integrator is an inherent part of the neuron there is no need to use additional integrators in the feedback path of a recurrent network in order for the network to be a Continuous Time Recurrent Neural Network. As a simple example, the simulation was used to build a 0.8 Hz oscillator using a ring of 11 neurons that were configured as inverters with 100 ms delay. (see FIG. 5)
d. Low silicon resources: A neuron (of the example) with 10 inputs can be implemented in a logic of 700 equivalent gates.
e. Low power consumption: A neuron (of the example) with 10 inputs that is implemented in 20 nm process will consume less than 10 nW.
f. Low peaks of power consumption due to randomized spikes timing—Simulation shows consumption of 100 uW for a 10,000 neurons network with 119 uW peak power. The importance of reducing the current peaks has to do with the stability of the synchronous digital design. For instance, if thousands of neurons in the chip would need to fire spikes at exactly the same clock cycle it would increase the risk for a failure due to spike noise at the supply network. This is because many neurons in the chip need to be connected to other neurons via long wires (as there may be neurons that have inputs coming from thousands of other neurons). This can be prevented by randomizing the timing of firing a spike at the neuron output. For comparison, if a central scheduler is to be used for assigning separate time slots for different neurons, then it would increase the number of inter-connections in the chip. The "randomization" happens naturally because every neuron has its own number of inputs and produces its output pulse when finishing the scanning of its inputs. Also, each neuron can read the next random number from the random-generator to add an artificial random delay to its own pulse.

There may be provided a method for neural cell processing, the method may include performing multiple processing iterations. Each processing iteration may include (i) determining which previous neural cell generated a pulse between the previous processing iteration and the current processing iteration; (ii) for each previous neural cell that generated such a pulse adding a synopsis weight assigned to that previous neural cell to generate a weighted sum; (ii) calculating a sum of a bias and (a) a product between a memory constant (alpha) and a sum of (b) the weighted sum and state variable of previous processing iteration; (ii) comparing the sum to a random or pseudo-random variable; and (ii) selectively generating an output pulse based on the comparison result.

The method may be implemented by a fully digital neural cell.

The full digital neural cell may be free of multipliers.

Figure 6:
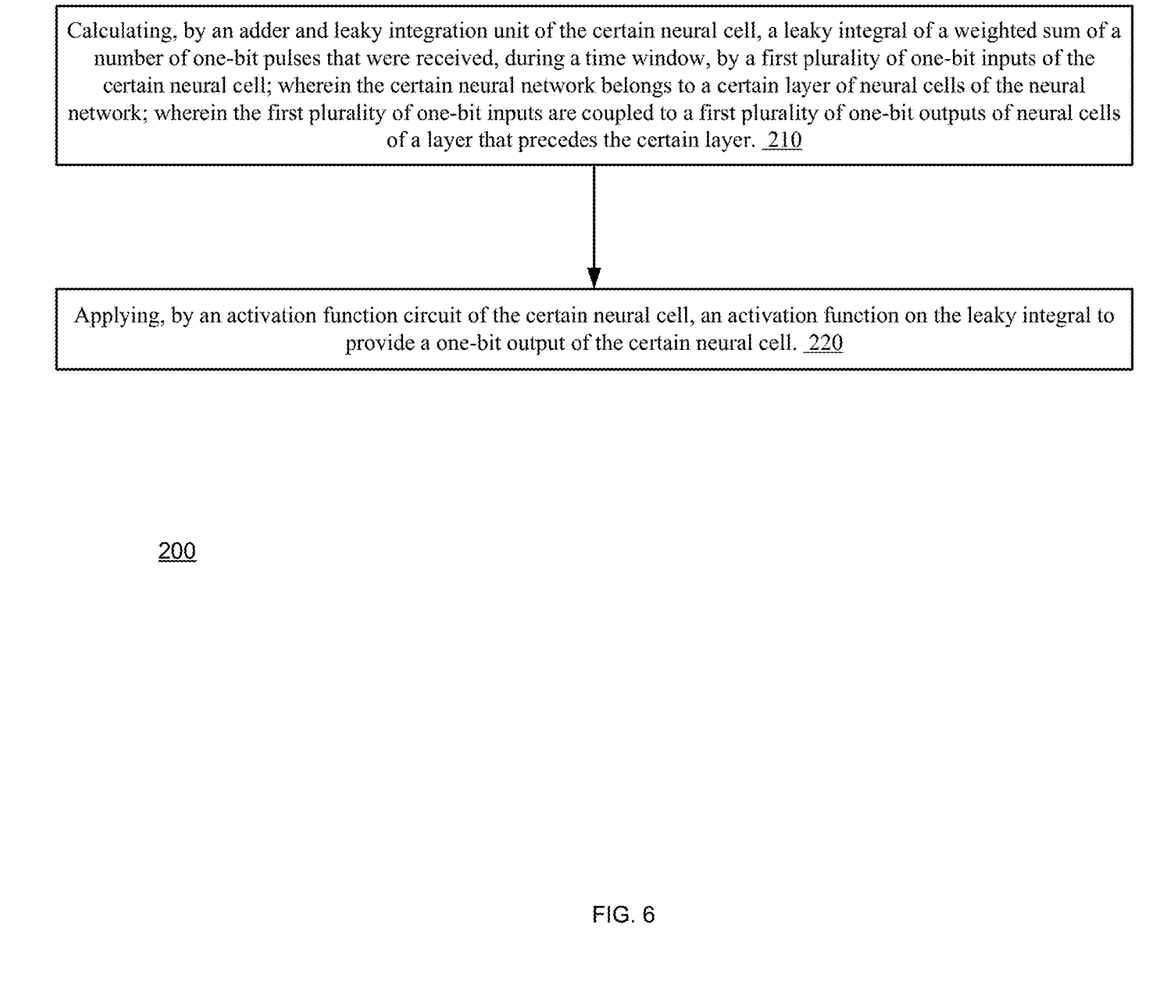
FIG. 6 illustrates a method.

FIG. 6 illustrates method 200.

Method 200 is for activating a certain neural cell of a neural network.

Method 200 starts by step 210 of calculating, by an adder and leaky integration unit of the certain neural cell, a leaky integral of a weighted sum of a number of one-bit pulses that were received, during a time window, by a first plurality of one-bit inputs of the certain neural cell; wherein the certain neural network belongs to a certain layer of neural cells of the neural network; wherein the first plurality of one-bit inputs are coupled to a first plurality of one-bit outputs of neural cells of a layer that precedes the certain layer.

Step 210 may be followed by step 220 of applying, by an activation function circuit of the certain neural cell, an activation function on the leaky integral to provide a one-bit output of the certain neural cell.

Although some of the previous figures illustrated an activation function of a sigmoid—any other activation may be applied—for example soft step, step, tangent, arctangent, identity, binary step, rectified linear unit, leaky rectified linear unit, randomized leaky rectified unit, exponential linear unit, scaled exponential linear unit, Gaussian, and the like. Examples of such functions are illustrated in wikipedia.org under the subject "activation function".

Figure 7:
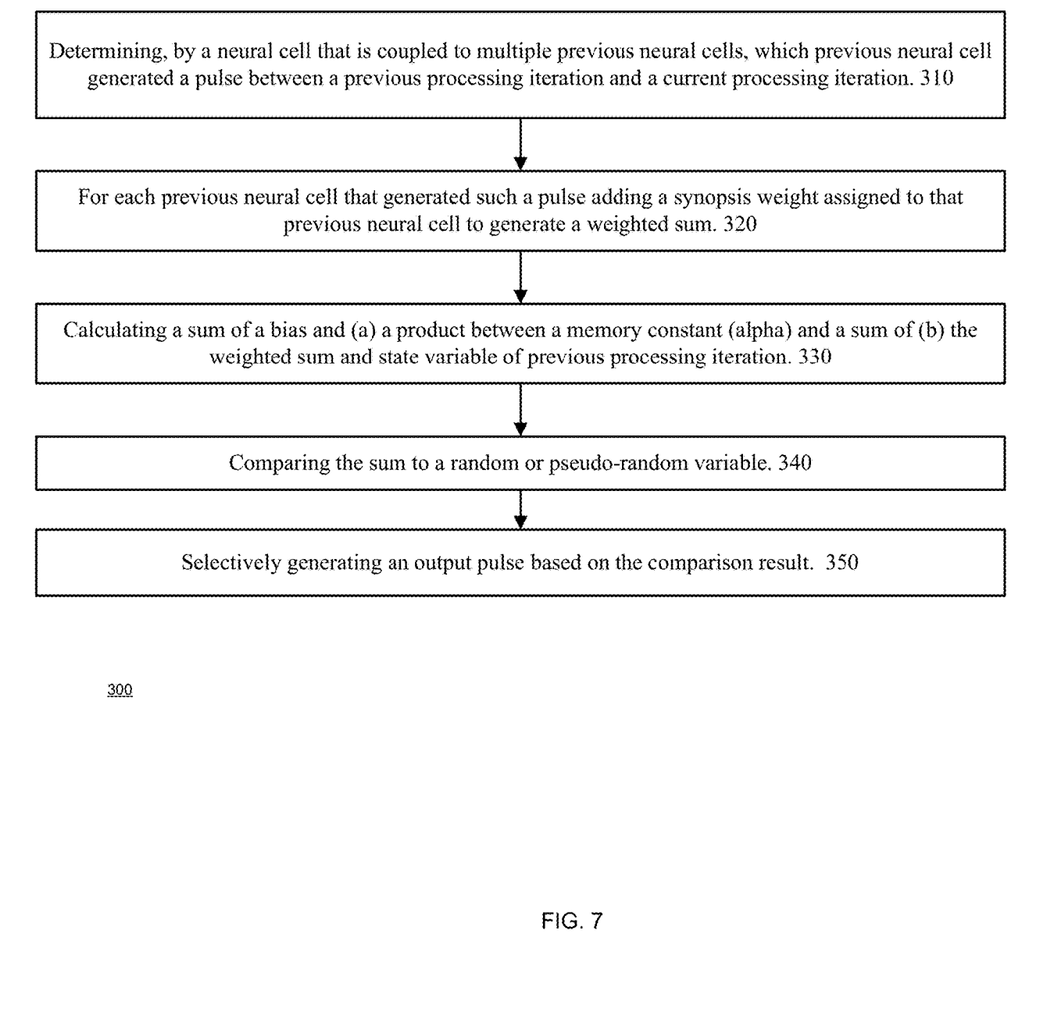
FIG. 7 illustrates a method.

FIG. 7 illustrates method 300.

Method 300 is for performing neural network processing, the method may include performing multiple neural network processing iterations.

Each neural network processing iteration may include:
a. Determining, by a neural cell that is coupled to multiple previous neural cells, which previous neural cell generated a pulse between a previous processing iteration and a current processing iteration. 310
b. For each previous neural cell that generated such a pulse adding a synopsis weight assigned to that previous neural cell to generate a weighted sum. 320
c. Calculating a sum of a bias and (a) a product between a memory constant (alpha) and a sum of (b) the weighted sum and state variable of previous processing iteration. 330
d. Comparing the sum to a random or pseudo-random variable. 340
e. Selectively generating an output pulse based on the comparison result. 350

Figure 8:
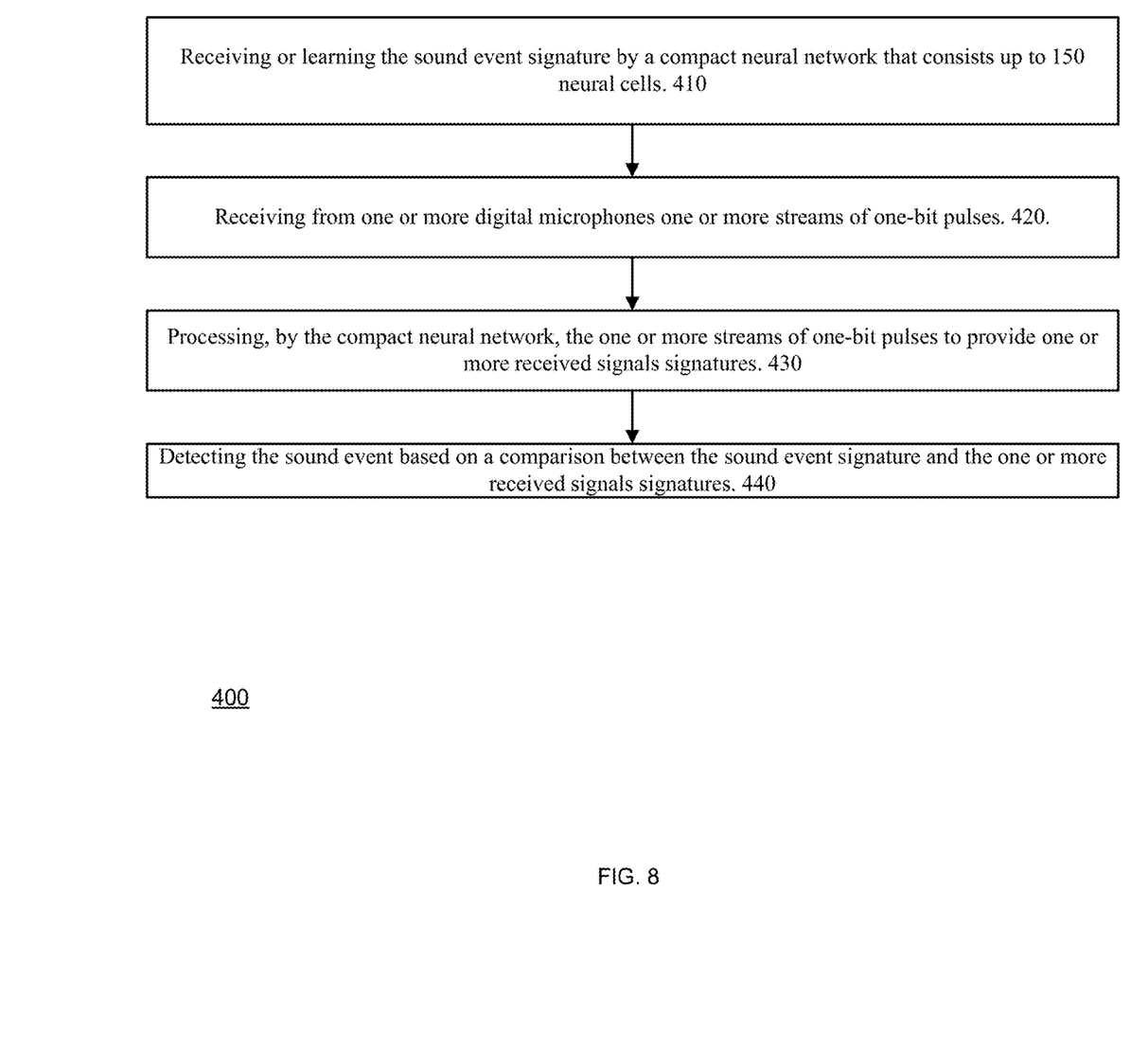
FIG. 8 illustrates a method.

FIG. 8 illustrates method 400.

Method 400 is for detecting a sound event having a sound event signature.

Method 400 may include:
a. Receiving or learning the sound event signature by a compact neural network that consists up to one hundred and fifty neural cells. 410
b. Receiving from one or more digital microphones one or more streams of one-bit pulses. 420
c. Processing, by the compact neural network, the one or more streams of one-bit pulses to provide one or more received signals signatures. 430
d. Detecting the sound event based on a comparison between the sound event signature and the one or more received signals signatures. 440

Figure 9:
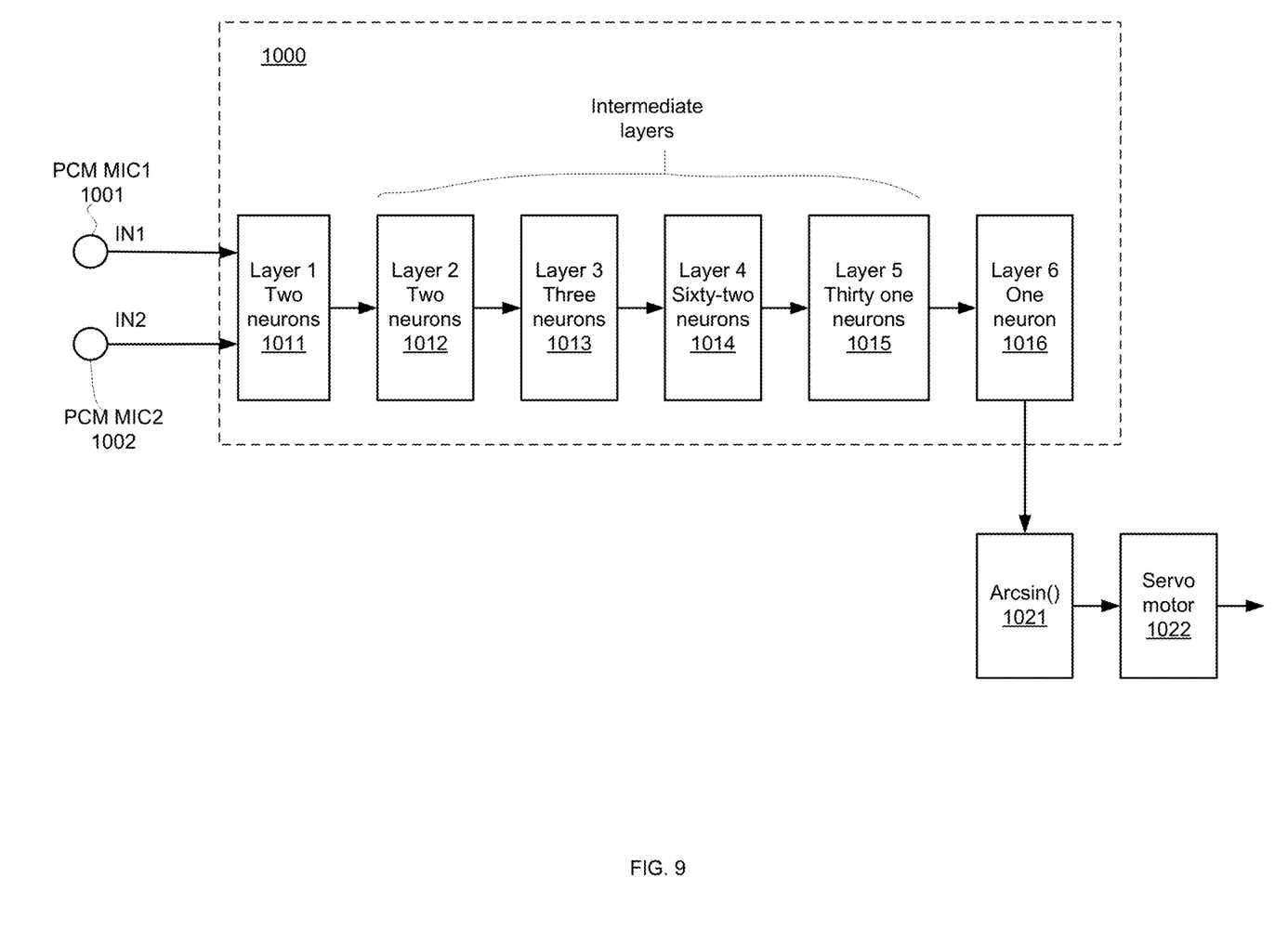
FIG. 9 illustrates a neural network.

FIG. 9 illustrates a neural network 1000 and its environment.

FIG. 9 illustrates a neural network 1000 that is a part of a unit that detects a direction of a speaker.

There are two PCM microphones 1001 and 1002 that provide two digital PCM inputs to the neural network 1000. The neural network is followed by an arc-sinus unit 1021 that is followed by a servo motor 1022.

The neural network may include one or more input neural cells, one or more intermediate layers and an output layer of neural cells. In FIG. 9 the one or more input neural cells that are included in layer 1 (two neurons) 1011, four intermediate layers—layer 2 1012 (includes two neurons), layer 3 1013 (includes three neurons), layer 4 1014 (includes sixty-two neurons) and layer 5 1015 (includes thirty one neurons), and output layer (layer 6 1016—includes one neuron).

Layer 1 performs DC offset removal—sets to 0 the DC component of the inputs from the two Mics.

Layer 2 performs Amplifier.

Layer 3 performs Bandpass filter and VAD—Makes bandpass 2-6 KHz of the audio input and then energy-detector as "VAD"

Layer 4 performs Phase detector—Makes cross-correlation between the input of one Mic and the delayed input from the other Mic Layer 5 performs Integrate the correlation outputs over time and compare for maximum search Layer 6 performs Delay predictor—Inspect the results of Layer 5 and predict the delay between the two Mics Arc sinus unit (ARCSIN( )) 1021 is an Arc-Sine lookup table that converts the delay between Mics signals into angle of audio source (versus the Mics plane).

Servo Motor 1022 (and servo motor interface logic)—produces PWM pulses to a servo motor to move an arm to point at audio source.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A neural network, comprising multiple layers of neural cells;
    wherein a certain neural cell of a certain layer of neural cells comprises:
        a first plurality of one-bit inputs;
        an adder and leaky integrator unit; and
        an activation function circuit that has a one-bit output;
        wherein the first plurality of one-bit inputs are coupled to a first plurality of one-bit outputs of neural cells of a layer that precedes the certain layer;
        wherein the adder and leaky integration unit is configured to calculate a leaky integral of a weighted sum of a number of one-bit pulses that were received, during a time window, by the first plurality of one-bit inputs; and
        wherein the activation function circuit is configured to apply an activation function on the leaky integral to provide a one-bit output of the certain neural cell.

2. The neural network according to claim 1, wherein the activation function is a sigmoid and wherein the activation function unit comprises a random number generator for generating random numbers and a comparator for comparing the leaky integral to a sum of at least two of the random numbers.

3. The neural network according to claim 1, wherein the activation function is a sigmoid and wherein the activation function unit comprises a pseudo-random number generator for generating pseudo-random numbers and a comparator for comparing the leaky integral to a sum of at least two of the pseudo-random numbers.

4. The neural network according to claim 1, wherein the activation function is a rectified linear unit, and the activation function circuits is configured to calculate the rectified linear unit.

5. The neural network according to claim 1, wherein the certain neural cell comprises multiple flip-flops that are configured to store the one-bit pulses, a memory for storing a bias value and for storing weights associated with the one-bit inputs, and an adder that is configured to calculate the leaky integral using the content of the multiple flip-flops, the bias value and the weights.

6. The neural network according to claim 1, wherein the adder and leaky integrator unit comprises a shift register that is configured to apply a leaky function.

7. The neural network according to claim 1, wherein the neural network is free of multipliers.

8. The neural network according to claim 1, wherein the neural network consists of up to 200 neurons.

9. The neural network according to claim 1, wherein neural cells of an input layer of the neural network have a single one-bit input.

10. The neural network according to claim 1, wherein the neural network is a purely digital neural network.

11. A method for activating a certain neural cell of a neural network, wherein the method comprises:
    calculating, by an adder and leaky integration unit of the certain neural cell, a leaky integral of a weighted sum of a number of one-bit pulses that were received, during a time window, by a first plurality of one-bit inputs of the certain neural cell; wherein the certain neural network belongs to a certain layer of neural cells of the neural network; wherein the first plurality of one-bit inputs are coupled to a first plurality of one-bit outputs of neural cells of a layer that precedes the certain layer; and applying, by an activation function circuit of the certain neural cell, an activation function on the leaky integral to provide a one-bit output of the certain neural cell.

12. The method according to claim 11, wherein the activation function is a sigmoid and wherein the applying of the activation function comprises generating random numbers by a random number generator of the activation function circuit and comparing, by a comparator of the activation function circuit, the leaky integral to a sum of at least two of the random numbers.

13. The method according to claim 11, wherein the activation function is a sigmoid and wherein the applying of the activation function comprises comprises generating, by a pseudo-random number generator of the activation function circuit, pseudo-random numbers and comparing, by a comparator of the activation function circuit, the leaky integral to a sum of at least two of the pseudo-random numbers.

14. The method according to claim 11, wherein the activation function is a rectified linear unit, and wherein the applying of the activation function comprises comprises calculating the rectified linear unit.

15. The method according to claim 11, comprising storing by multiple flip-flops of the certain neural cell the one-bit pulses, storing by a memory of the certain neural cell a bias value and weights associated with the one-bit inputs, and calculating by an adder of the certain neural cell, the leaky integral using the content of the multiple flip-flops, the bias value and the weights.

16. The method according to claim 11, comprising applying, by a shift register of the adder and leaky integrator unit, a leaky function.

17. The method according to claim 11, wherein the neural network is free of multipliers.

18. The method according to claim 11, wherein the neural network consists of up to 200 neurons.

19. The method according to claim 11, wherein neural cells of an input layer of the neural network have a single one-bit input.

20. The method according to claim 11, wherein the neural network is a purely digital neural network.

* * * * *